(12) United States Patent
Guizard et al.

(10) Patent No.: US 8,241,392 B2
(45) Date of Patent: Aug. 14, 2012

(54) GAS PHASE METHOD FOR PRODUCING NANOMETRIC PARTICLES

(75) Inventors: Benoit Guizard, Creteil (FR); Francois Tenegal, Paris (FR)

(73) Assignee: Commissariat a l'Energie Atomique, Paris (FR)

(*) Notice: Subject to any disclaimer, the term of this patent is extended or adjusted under 35 U.S.C. 154(b) by 841 days.

(21) Appl. No.: 12/302,797

(22) PCT Filed: May 29, 2007

(86) PCT No.: PCT/EP2007/055161
§ 371 (c)(1),
(2), (4) Date: Nov. 26, 2008

(87) PCT Pub. No.: WO2007/138034
PCT Pub. Date: Dec. 6, 2007

(65) Prior Publication Data
US 2009/0294274 A1    Dec. 3, 2009

(30) Foreign Application Priority Data
May 30, 2006   (FR) ...................................... 06 51959

(51) Int. Cl.
*B22F 9/12*   (2006.01)
*B01J 12/02*  (2006.01)
*B82B 3/00*   (2006.01)

(52) U.S. Cl. ........................ 75/345; 204/157.4; 977/896

(58) Field of Classification Search ................... 75/345; 204/157.4, 157.41, 157.44; 977/896
See application file for complete search history.

(56) References Cited

U.S. PATENT DOCUMENTS

2003/0143153 A1*  7/2003  Boulos et al. .............. 423/592.1
2004/0065170 A1   4/2004  Wu

FOREIGN PATENT DOCUMENTS

| EP | 0776862 A1 | 6/1997 |
| EP | 776862 A1 * | 6/1997 |
| EP | 1514846 A1 | 3/2005 |
| WO | 02086179 A2 | 10/2002 |
| WO | 2006028140 A1 | 3/2006 |

OTHER PUBLICATIONS

International Search Report, PCT/EP2007/055161, dated Jul. 31, 2007.

* cited by examiner

*Primary Examiner* — George Wyszomierski
*Assistant Examiner* — Mark L Shevin
(74) *Attorney, Agent, or Firm* — Nixon Peabody LLP

(57) ABSTRACT

The invention relates to a gas phase method for producing nanometric particles in a reactor for producing particles in a gas phase, in which there is an interaction between a reaction flow and an energy flow. This method comprises the following steps: a step for coupling a device for producing gaseous chlorides with this reactor, a step for producing gaseous chlorides from a base precursor in the form of powders, and a step for injecting such a reaction flow into the reactor.

11 Claims, 1 Drawing Sheet

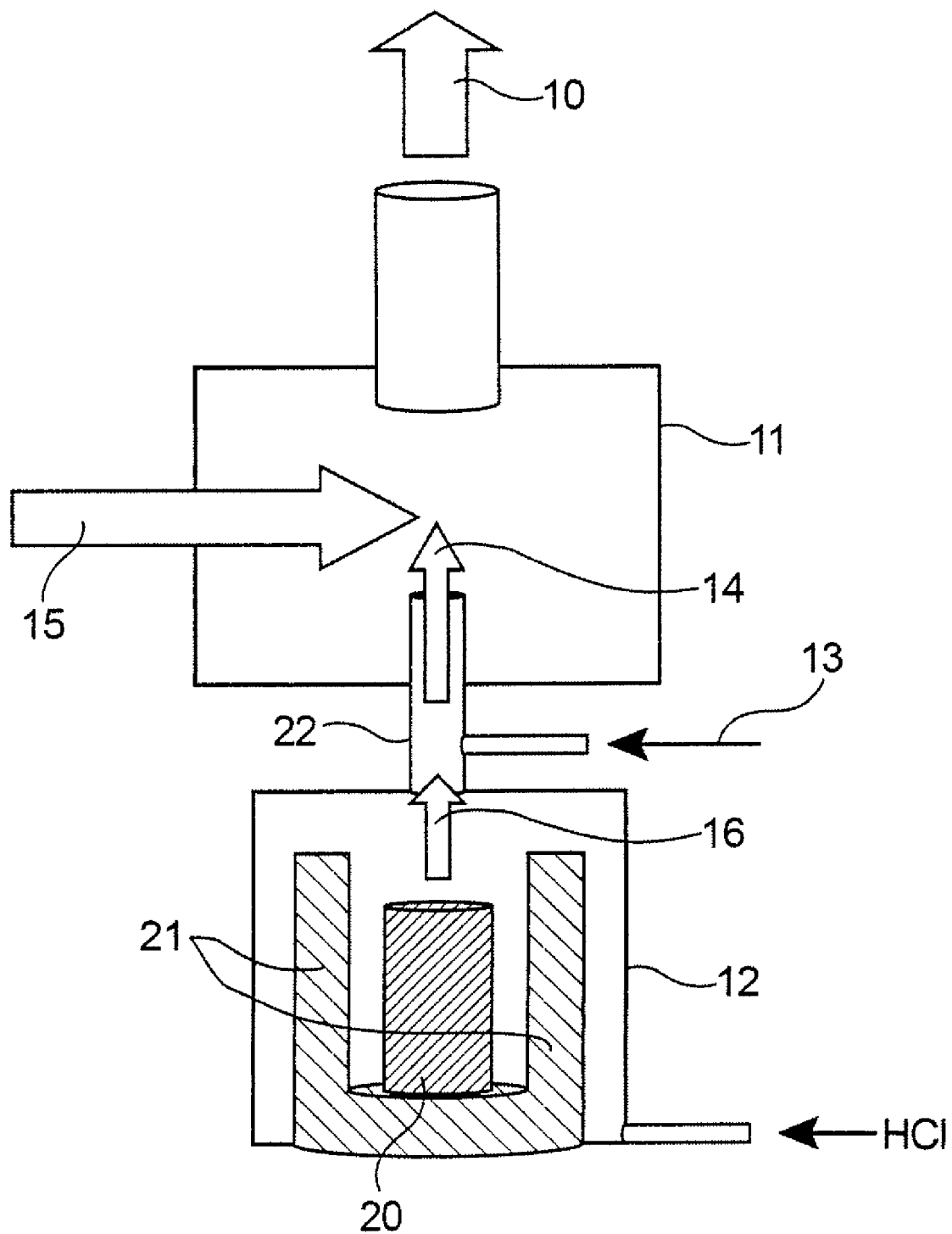

GAS PHASE METHOD FOR PRODUCING NANOMETRIC PARTICLES

This application is a national phase of International Application No. PCT/EP2007/055161, entitled "GASEOUS PHASE PROCESS FOR THE PRODUCTION OF NANOSCALE PARTICLES", which was filed on May 29, 2007, and which claims priority of French Patent Application No. 06 51959, filed May 30, 2006.

TECHNICAL FIELD

The invention relates to a gas phase method for producing nanometric particles.

PRIOR STATE OF THE ART

Nanometric particles, or nanoparticles, are particles with a size less than 100 nm in the three spatial dimensions. Because of their very small size, these nanoparticles have characteristics (reactivity, quantum confinement effects) making them particularly attractive for a wide range of applications.

Among all the existing or prospective applications, mention may be made of the biomedical field with the application of nanoparticles for labeling, tracing or targeted therapy ($Fe_2O_3$, $SiO_2$, Si . . . ), cosmetics ($TiO_2$, ZnO) with ultraviolet barriers (UV) or further colored effects in formulations.

Other applications in the field of catalysis or advanced systems for energy are also possible (Pt—$TiO_2$, Pd—$TiO_2$, fullerenes, . . . ). Nitride and carbide nanoparticles (ZrC, ZrN, TiC, TiN, SiC, $Si_3N_4$, WC, . . . ) and composites, for example pure MAX phases, may find applications in very diverse (polishing, aeronautical, automobile, nuclear, cutting tool, . . . ) fields. For example, carbide nanoparticles may be shaped and sintered in order to obtain dense ceramics having improved properties in extreme environments (high temperatures, oxidizing atmospheres, irradiations). These nanoparticles may be associated with each other for the purpose of forming composites having improved properties. A known example concerns the reinforcement of alumina ($Al_2O_3$) or silicon nitride ($Si_3N_4$) matrices by silicon carbide (SiC) particles for cutting tool applications. By applying carbide type nanoparticles, in the case of composites, the properties of the matrices may be strongly improved.

The aforementioned MAX phases represent a family of compounds for which the chemical formula is $M_{n+1}AX_n$ wherein n has the value 1, 2 or 3; M is a transition metal (Ti, Zr, Hf, V, Nb, Ta, Cr or Mo); A is Al, Si, Ge or Ga, and X is C, N or B. This family of materials is characterized by a hexagonal crystalline structure containing a stack of nanometric layers, and a small proportion of non-metal atoms (25%, 33% and 37.5% when n has the value 1, 2 and 3, respectively).

By using nanoparticles, it is possible to refine the microstructure of ceramics after sintering which may lead to the occurrence of a superplastic behavior of the formed parts. This behaviour has already been revealed in the case of micro-/nano-structured composites of the $Si_3N_4$/SiC type or in nano-structured SiC. Superplasticity is an interesting property because it enables ceramic parts to be shaped according to complex geometries by hot-forming starting from simple shapes.

A large number of methods for producing nanoparticles exist (plasma, laser pyrolysis, combustion, evaporation-condensation, supercritical fluids, gel-sol, co-precipitation, hydrothermal synthesis . . . ,), some being more suitable for the production of oxides (combustion, evaporation-condensation, supercritical fluids, gel-sol, co-precipitation, hydrothermal synthesis . . . ) and others for the synthesis of non-oxide particles in a gas phase (laser pyrolysis as described in the document referenced as [1] at the end of the description, plasma, evaporation-condensation).

The whole of these methods use gas and/or liquid and/or solid precursors in order to produce metal, oxide, carbide, nitride and composite nanoparticles. The precursors used depend on the applied method as well as on the nature of the nanoparticles which one seeks to synthesize.

The liquids and the solids may be organometallic precursors (isopropoxides, alkoxides, hydroxides, metallocenes, nitrates . . . ), the molecules of which contain a metal element as well as oxygen and hydrogen atoms, but also very often carbon or even nitrogen. The organometallic solid particles are soluble in water or in organic solvents. These precursors may be used for synthesizing oxide nanoparticles because the molecules making them up contain oxygen in the large majority of the cases. The metal atoms are always introduced into the methods simultaneously with oxygen and/or carbon and/or nitrogen and hydrogen atoms. This characteristic is of a nature for inducing a constraint on the nature of the formed nanoparticles at the close of the synthesis methods. Indeed, the fact that the organometallic molecules contain oxygen and/or carbon and/or nitrogen and hydrogen elements which may be associated with metal atoms, induces a constraint on the nature of the formed nanoparticles: the simultaneous presence of oxygen and carbon atoms within a single and same molecule, may promote the formation of oxide-carbide composites. For example, the use of molecules containing a metal, carbon, oxygen (or nitrogen) and hydrogen, in the gas phase synthesis methods, such as laser pyrolysis, leads to the formation of oxide-carbide (or carbide-nitride) composites. An example is the synthesis by laser pyrolysis of Si/C/O or further Si/C/N powders by using hexamethyldisiloxane and hexamethyldisilazane, respectively, as described in the document referenced as [2]. Obtaining nanoparticles containing a single kind of phase (oxide or carbide or nitride) or a well determined mixture of phases, and different from that of the starting molecule, requires working towards oxidization, carbidation, or nitridation of the products in methods using this type of molecules, which is an additional expenditure. The simultaneous presence of oxygen and/or carbon and/or nitrogen in the organometallic molecules may prove to be totally redhibitory when one seeks to synthesize carbides, nitrides, silicides and pure MAX phases. Moreover, the cost of organometallic molecules is high and increases very rapidly with the purity level of the precursors.

Carbonyls are other molecules made up of a metal atom surrounded by CO groups ($Cr(CO)_6$, $Mo(CO)_6$, $W(CO)_6$, $Fe(CO)_5$ . . . ) which may be used for the synthesis of certain metal carbide, nitride, silicide nanoparticles, and certain MAX phases by adding carbon ($C_2H_2$, $C_2H_4$, . . . ), nitrogen ($NH_3$, . . . ) precursors or further silicon precursors ($SiH_4$, $SiH_2Cl_2$, . . . ) and titanium precursors ($TiCl_4$). However a significant drawback related to the use of carbonyl precursors is their cost (see Table 1 at the end of the description for a few examples).

Certain known chlorides or fluorides ($TiCl_4$, $SiH_2Cl_2$, $WF_6$, . . . ) may also be used for producing carbide, nitride, silicide nanoparticles and certain MAX phases. The advantage related to the use of these precursors is their purity: unlike organometallic molecules, these molecules indeed do not contain chemical species such as oxygen and/or carbon and/or further nitrogen, species capable of forming with the solid metal oxide, carbide and nitride phases in a poorly controlled way after synthesis. Molecules based on halogens (chlorides, fluorides) contain volatile species such as chlorine or fluorine with in certain cases hydrogen. These molecules may be combined with carbon precursors ($C_2H_4$, $C_2H_2$, ...) and/or nitrogen precursors ($NH_3$, ...) and/or further silicon precursors ($SiH_4$) in order to form carbides and/or nitrides and/or silicides. Mass production of certain oxide nanoparticles ($TiO_2$) is moreover accomplished by using this type of precursors. Another advantage related to the use of these precursors is the allowed flexibility as to the chemical composition of the formed phases. Indeed the introduction of constituents, by using molecules which only contain a single one of these species which one seeks to obtain in solid form, provides unequalled flexibility. It is possible to form silicide phases ($Ti_xSi_y$, ...) and composite phases, the chemical composition of which may be adjusted at will by injecting at a controlled flow rate the different reagents which separately provide the constituent atoms of the phases which one seeks to form.

Other solid particles (or powders) may be used for the synthesis of nanoparticles in a gas phase. The latter are insoluble inorganic particles. A considerable advantage related to the use of powders is the cost. Indeed, by using powders instead of precursors originating from chemistry, it is possible to obtain a gain by a factor of 10 on the cost of production (see Table 1 at the end of the description for a few examples). The powders may be used as a precursor in the synthesis methods characterized by a massive and rapid supply of energy and leading to vaporization of the constituents of the powder and then to germination of particles, the growth of which is blocked by a quenching effect. An example is the plasma synthesis of nanoparticles by using powders. However the synthesis yields by using this method are low because vaporization of the constituents of the powder is far from being complete.

Another example of the use of inorganic solid precursors is the synthesis of metal or oxide nanoparticles by evaporation-condensation. However these methods do not allow the synthesis of nanoparticles made up from refractory metal elements with high melting points (Zr, W, Mo, ...).

The technical problem posed by the state of the art is therefore low cost synthesis of a wide range of nanoparticles of the metal carbide, nitride, oxide, silicide and composite type, the MAX phases of which either containing or not refractory metals (W, Zr, Mo, ...). For refractory metals, the question is notably to find a optimized cost method allowing injection into a reaction area of refractory metals with a high melting point, in larger amounts and by applying temperatures as low as possible.

The object of the invention is to solve this technical problem by proposing a gas phase method for producing nanometric particles with high purity at a low cost.

DISCUSSION OF THE INVENTION

The invention relates to a gas phase method for producing nanometric particles in a reactor for producing particles in a gas phase, in which there is an interaction between a reaction flow and an energy flow, characterized in that it comprises the following steps:
- a step for coupling a device for producing gaseous chlorides with this reactor,
- a step for producing gaseous chlorides from a base precursor in the form of powders, and
- a step for injecting the thereby formed reaction flow into the reactor.

The nanometric particles may be metal particles.

In an advantageous embodiment, the method of the invention further comprises a step for combining gaseous chlorides with at least one other precursor in order to form the reaction flow, before the step for injecting this reaction flow into the reactor.

The nanometric particles may then be carbide, nitride, oxide, silicide and composite particles, for example pure MAX phases.

The nanometric particles may comprise refractory materials with a high melting point such as: W, Zr, Co . . . .

Advantageously, the gaseous metal chlorides are produced in the device for producing chlorides by heating metal powders and reacting them with hydrochloric acid at temperatures below 1,000° C. and even below 500° C.

In an advantageous exemplary embodiment, the metal powder is zirconium metal powder. The energy flow is emitted by a $CO_2$ or CO laser. The carbon precursor is ethylene. The energy flow may also be emitted by a plasma torch.

This method advantageously allows separate injection of all the constituents of the nanometric particles which one wishes to form, and promotion of the production of multi-element particles, the chemical composition of which may be varied at will by independently varying the flow rate of each of the precursors.

This method also allows generation and injection of large amounts of refractory metals, (Zr, W, Mo, Ta . . . ), as gaseous chlorinated molecules at an optimized cost by only using commercial refractory metal powders and hydrochloric acid (HCl).

This method has the advantage of not being very costly as it allows the use of commercial powders which are the cheapest precursors with a purity level equal to that of the other known precursors. By chlorinating commercial powders in situ in this method for synthesizing nanometric particles, a gain by up to a factor ten on the production cost may be obtained as compared with the use of commercial chlorides.

SHORT DESCRIPTION OF THE DRAWINGS

The single FIGURE illustrates a device applying the method of the invention.

DETAILED DISCUSSION OF PARTICULAR EMBODIMENTS

As illustrated in the FIGURE, the invention relates to a gas phase method for producing metal nanometric particles, possibly carbide, nitride, oxide, silicide or composite nanometric particles, for example pure MAX phases 10 in a reactor 11 for producing particles in a gas phase from gaseous chloride 16, generated by a chlorinator 12. This chlorinator 12 actually allows these gaseous chlorides 16 to be generated from powders 20 (base precursor), by heating at temperatures below 1,000° C. and preferably below 500° C., for example by means of heating resistors 21, and by reaction with hydrochloric acid (HCl). These gaseous chlorides 16 may be injected into the reactor 11 with one or more other precursors 13, for example ethylene ($C_2H_4$).

In this method, there is an interaction between a reaction flow 14 containing these gaseous chlorides 16 issued from the chlorinator 12 and possibly this(these) other precursor(s) 13, and an energy flow 15.

With this energy flow 15, a sufficient transfer of energy to the reaction flow 14 may be achieved in order to generate a pyrolysis reaction of the mixture, which is characterized by the decomposition of the reagents followed by germination of particles, the growth of which is blocked by a quenching effect.

The source of the energy flow 15 may be a laser (laser pyrolysis method) or a plasma torch (plasma method).

In the case of the use of a laser, the latter may be a $CO_2$ or a CO laser.

Example of the Production of Pure ZrC Nanoparticles by Laser Pyrolysis Using a $CO_2$ Laser.

In this example, a laser pyrolysis reactor 11 is used, connected to the chlorinator 12, zirconium powder 20 (base precursor) is introduced into the chlorinator 12 under an inert atmosphere in order to avoid pyrophoric effects upon contact of the powder with air.

The powder is heated to more than 450° C. and swept by a flow of gaseous hydrochloric acid (HCl) in order to chlorinate the vapors. These vapors are then conveyed via an injection nozzle 22 into the laser pyrolysis reactor 11. The nozzle 22 is heated to more than 300° C. in order to avoid condensation of $ZrCl_4$ in the conduits before the synthesis reaction. The gaseous precursor 13 is ethylene ($C_2H_4$). It is introduced at the injection nozzle 22 mixed with $ZrCl_4$. It was selected because it absorbs the infrared radiation 15 of the laser at 10.6 microns (wavelength of the $CO_2$ laser) and redistributes the energy to the medium so that a flame reaction occurs. This reaction expresses the decomposition of the precursors followed by the germination of nanometric particles, the growth of which is stopped by a quenching effect. The source of the energy flow 15 is a 5 kW $CO_2$ laser.

The cost for producing 1 kg/h of zirconium nanoparticles through the chlorinator route is of the order of 1,300€ (the cost of the precursors is conditioned by the cost of the one providing the zirconium, the others may be neglected).

The obtained purity is that of the starting powder, i.e. that of zirconium as given in the Table hereafter, i.e. of the order of 99.7%.

With Table 1, it may be understood that the method of the invention provides a drastic reduction in cost, since for example the zirconium as a powder has a cost of the order of 1,300€ per kilogramme whereas commercial zirconium chloride ($ZrCl_4$) has a cost of the order of 5,700€ per kilogram of metal.

TABLE 1

Comparison of the approximate price of a few precursors for a few refractory metals

| Metal element and associated precursors | Price (€/kg) | Purity (%) | Price of one kg of metal (€/kg) |
|---|---|---|---|
| W | | | |
| W(CO)$_6$ | 16,000 | 99.9 | 30,000 |
| WF$_6$ | 29,000 | 99.9 | 47,000 |
| W(Cl$_6$) | 1,710 | 99.9 | 3,700 |
| W (1-10 μm powder) | 154-316 | 99.9 | 154-316 |
| Zr | | | |
| Zr(Cl$_4$) | 2,237 | 99.9 | 5,700 |
| ZrF$_4$ | 2,700 | 99.9 | 5,000 |
| Zr (<20 μm powder) | 1,310 | 99.7 | 1,310 |
| Mo | | | |
| Mo(CO)$_6$ | 9,740 | 99.9 | 27,000 |
| Mo(Cl$_5$) | 14,400-1,259 | 99.99-98 | 41,000-3,600 |
| MoF$_6$ | 13,480 | 99.9 | 29,500 |
| Mo (1-2 μm powder) | 355 | 99.9 | 355 |

REFERENCES

[1] Article entitled <<Sinterable Ceramic Powders from laser—Driven Reactions: I, Process Description and Modeling>> by W. R. Cannon, S. C. Danforth, J. H. Flint, J. S. Haggerty and R. A. Marra (Journal of the American Ceramic Society, Volume 65, No. 7, pages 324-239, July 1982).

[2] Article entitled <<Nanometric Si-Based Oxide Powders: Synthesis by laser Spray Pyrolysis and Characterization>> by Nathalie Herbin, Xavier Armand, Emmanuel Musset, Hervé Martinengo, Michel Luce and Michel Cauchetier (Journal of the European Ceramic Society, 16, 1996, pages 1063-1073).

The invention claimed is:

1. A method for producing nanometric particles in a gas phase in a reactor, in which there is an interaction between a reaction flow and an energy flow, comprising the following steps:
coupling a device for producing gaseous chlorides with the reactor,
producing gaseous chlorides in a chlorinator by heating a base precursor in the form of metal powders, and reacting them with hydrochloric acid to produce the reaction flow, and
injecting the thereby formed reaction flow into the reactor.

2. The method according to claim 1, wherein the nanometric particles are metal particles.

3. The method according to claim 1, further comprising combining gaseous chlorides with at least one other precursor in order to form the reaction flow.

4. The method according to claim 3, wherein the nanometric particles are carbide, nitride, oxide, silicide or MAX phases.

5. The method according to claim 1, wherein the nanometric particles contain refractory metals.

6. The method according to claim 5, wherein the refractory metals are selected from the group consisting of: W, Zr, and Co.

7. The method according to claim 1, wherein the gaseous metal chlorides are produced in the chlorinator, by heating powders and reacting them with hydrochloric acid at temperatures below 1,000° C.

8. The method according to claim 7, wherein the temperature is below 500° C.

9. The method according to claim 1, wherein the nanometric particles comprise constituents which are injected separately in the reactor.

10. The method according to claim 1, wherein the energy flow is emitted by a $CO_2$ or CO laser, or a plasma torch.

11. The method according to claim 1, wherein said at least one other precursor comprises ethylene.

* * * * *